(12) United States Patent
Kim et al.

(10) Patent No.: US 10,082,617 B2
(45) Date of Patent: Sep. 25, 2018

(54) LIGHT GUIDE PLATE AND BACKLIGHT UNIT COMPRISING SAME

(71) Applicant: KOLON INDUSTRIES, INC., Gwacheon-si (KR)

(72) Inventors: Min Jeong Kim, Yongin-si (KR); Kyoung Hwa Kim, Yongin-si (KR); Sang Hwa Shim, Yongin-si (KR); Chun Sung Cho, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days.

(21) Appl. No.: 15/513,240

(22) PCT Filed: Sep. 25, 2015

(86) PCT No.: PCT/KR2015/010176
§ 371 (c)(1),
(2) Date: Mar. 22, 2017

(87) PCT Pub. No.: WO2016/052942
PCT Pub. Date: Apr. 7, 2016

(65) Prior Publication Data
US 2017/0307806 A1    Oct. 26, 2017

(30) Foreign Application Priority Data

Sep. 30, 2014  (KR) .................. 10-2014-0131206
Sep. 24, 2015  (KR) .................. 10-2015-0135391

(51) Int. Cl.
*G02B 6/122*   (2006.01)
*G02F 1/1335*  (2006.01)
*F21V 8/00*    (2006.01)

(52) U.S. Cl.
CPC ........... *G02B 6/0065* (2013.01); *G02B 6/003* (2013.01); *G02B 6/0015* (2013.01); *G02F 1/133602* (2013.01)

(58) Field of Classification Search
CPC .... G02B 6/0065; G02B 6/0015; G02B 6/003; G02B 6/002; G02B 6/0038; G02F 1/133602
See application file for complete search history.

(56) References Cited

U.S. PATENT DOCUMENTS

| 8,371,735 B2 | 2/2013 | Chen et al. |
| 2007/0147760 A1 | 6/2007 | Iimura |
| 2015/0338568 A1* | 11/2015 | Onuma ................. G02B 1/045 362/611 |

FOREIGN PATENT DOCUMENTS

| KR | 10-1044193 | 6/2011 |
| KR | 10-2011-0134248 | 12/2011 |

(Continued)

OTHER PUBLICATIONS

KIPO, Office Action of Application No. 10-2015-0135391, dated Feb. 1, 2017.

(Continued)

*Primary Examiner* — Karabi Guharay
(74) *Attorney, Agent, or Firm* — Lex IP Meister, PLLC

(57) ABSTRACT

This invention relates to a light guide plate and a backlight unit including the same, and more particularly to a light guide plate, which is configured such that a surface layer having desired optical properties and hardness is provided in the form of a thin film on one surface of a substrate layer having excellent optical properties and exhibiting dimensional stability regardless of an external environment, thus (Continued)

manifesting superior processability and scratch resistance and minimizing luminance degradation, and to a backlight unit including the same.

17 Claims, 1 Drawing Sheet

(56) References Cited

FOREIGN PATENT DOCUMENTS

| | | |
|---|---|---|
| KR | 10-2012-0078618 | 7/2012 |
| KR | 10-2012-0088944 | 8/2012 |
| KR | 10-2013-0059765 | 6/2013 |
| TW | 200705022 | 2/2007 |
| TW | 200705036 | 2/2007 |

OTHER PUBLICATIONS

TIPO, Office Action of Application No. 104131883, dated Jul. 7, 2016.

\* cited by examiner

LIGHT GUIDE PLATE AND BACKLIGHT UNIT COMPRISING SAME

TECHNICAL FIELD

The present invention relates to a light guide plate for use in a liquid crystal display, and to a backlight unit assembly including the same.

BACKGROUND ART

With the advancement of industrial society into the high information age, the importance of electronic display devices as a medium for displaying and transferring various pieces of information is increasing. In particular, a liquid crystal display (LCD) is a technology-intensive device that incorporates liquid-crystal and semiconductor techniques, and is advantageous because it is thin and lightweight and consumes little power, and thus research and development into structures and fabrication methods thereof is ongoing, and it is useful in diverse fields.

Such an LCD device includes an additional light source on the rear side thereof to thus exhibit a color and an image because liquid crystals themselves cannot emit light.

An example of a light-emitting device includes a backlight unit (BLU). As an LCD device is recently manufactured to be slim, the use of LEDs (Light-Emitting Diodes) in place of conventional CCFLs (Cold Cathode Fluorescent Lamps) is rapidly increasing. LEDs (Light-Emitting Diodes) do not use mercury and manifest excellent color reproducibility.

Compared to a direct-type LED in which the LED is distributed on the front side of the backlight unit, an edge-type BLU in which the LED is distributed on the lateral sides thereof is advantageous in terms of power consumption and product thickness, and application thereof is thus increasing.

An edge-type BLU includes a light guide plate able to emit a light source to the front side from the lateral side. Light generated from the light source is incident from the lateral side of a light guide plate to the inside of the light guide plate and is then emitted to the front side thereof. In this way, the path of light passing through the light guide plate is relatively long, thus increasing light loss. In order to prevent this phenomenon, a polymethyl methacrylate (PMMA)-based material having high transmittance is mostly used. However, the PMMA-based material is weakly resistant to water due to its chemical structure and thus a light guide plate using the same suffers from warpage and poor dimensional stability under high-temperature and high-humidity conditions.

In this regard, Korean Patent Application Publication No. 10-2012-0088944 (Laid-open date: Aug. 9, 2012) discloses a light guide plate having multiple layers, comprising a pattern layer having a pattern and formed of a material having high MMA content, and a cover layer formed of a material having low MMA content, which are laminated together. It has been described that such a light guide plate may overcome yellowing problems due to laser or thermal processing.

DISCLOSURE

Technical Problem

The present invention is intended to provide a light guide plate, which has high dimensional stability regardless of an external environment.

The present invention is intended to provide a light guide plate, which not only has high dimensional stability despite an external environment but also exhibits easy laser processability and high scratch resistance.

The present invention is intended to provide a light guide plate, which not only has high dimensional stability regardless of an external environment, easy laser processability and high scratch resistance, but also minimizes luminance degradation.

The present invention is intended to provide a backlight unit, which includes the aforementioned light guide plate to thus increase processability and scratch resistance and realize high luminance.

Technical Solution

An embodiment of the present invention provides a light guide plate, comprising: a substrate layer including, as a main component, a resin having a light transmittance of at least 90%, a refractive index of 1.47 to 1.59, and a water absorption rate of less than 0.30%, and a surface layer formed on the lower surface of the substrate layer and composed mainly of a resin having a refractive index difference of 0.05 or less and a hardness increased by at least 1 H compared to the main component resin of the substrate layer, with a light transmittance of at least 90%.

In the light guide plate of the above embodiment, the surface layer may have a thickness corresponding to 1 to 5% of the total thickness of the light guide plate.

In the light guide plate of the above embodiment, the surface layer may have a thickness ranging from 30 μm to 150 μm.

In the light guide plate of the above embodiment, the surface layer may have a plurality of engraved patterns.

In the light guide plate of the above embodiment, the plurality of engraved patterns may be present within the surface layer, or may be formed in a shape that penetrates up to a predetermined thickness of the substrate layer through the surface layer.

In the light guide plate of the above embodiment, the plurality of engraved patterns may be formed in a shape that penetrates up to a thickness corresponding to 0.1 to 10% of the total thickness of the substrate layer.

In the light guide plate of the above embodiment, the plurality of engraved patterns may have a longitudinal cross-section having a shape selected from the group among a semicircular shape, a triangular shape, a rectangular shape, and an irregular shape.

The light guide plate of the above embodiment may be manufactured using a co-extrusion process.

In the light guide plate of the above embodiment, the co-extrusion process may be performed in a manner in which respective resins of the substrate layer and the surface layer are hot-melted into fluids using an extruder, and are simultaneously melt-discharged using a feed block, extruded via a T-die, and continuously pressed, so that the thickness uniformity of the surface layer satisfies 20% or less.

In the light guide plate of the above embodiment, the substrate layer may be composed mainly of a resin selected from the group consisting of a resin selected from among a polycarbonate-based resin, a polystyrene-based resin, an acrylic resin, an olefin-based resin, a polyester-based resin and a polyamide-based resin, a copolymer thereof, a mixture thereof, and a derivative thereof.

In the light guide plate of the above embodiment, the surface layer may be composed mainly of a resin selected from the group consisting of a resin selected from among a polycarbonate-based resin, a polystyrene-based resin, an acrylic resin, an olefin-based resin, a polyester-based resin and a polyamide-based resin, a copolymer thereof, a mixture thereof, and a derivative thereof.

In the light guide plate of the above embodiment, the substrate layer may be composed mainly of a copolymer including 60 wt % or less of methyl methacrylate.

In the light guide plate of the above embodiment, the surface layer may be composed mainly of a polymethyl methacrylate resin or a copolymer including at least 70 wt % of methyl methacrylate.

In the light guide plate of the above embodiment, the substrate layer may include a methyl methacrylate-styrene resin, and the surface layer may include a polymethyl methacrylate resin.

An exemplary embodiment of the present invention provides a backlight unit comprising the aforementioned light guide plate.

Advantageous Effects

According to the present invention, a light guide plate can exhibit dimensional stability regardless of the external environment, easy laser processability and high scratch resistance and can minimize luminance degradation. When the light guide plate is applied to a backlight unit, the processability and scratch resistance of the backlight unit can be increased, and high luminance can be realized.

DESCRIPTION OF DRAWINGS

FIGS. 1 to 3 are cross-sectional views of a light guide plate according to an embodiment of the present invention, wherein FIG. 1 illustrates a light guide plate having a surface layer including no engraved pattern, FIG. 2 illustrates a light guide plate having a surface layer including a plurality of engraved patterns, and FIG. 3 illustrates a light guide plate according to an embodiment of the present invention including a plurality of engraved patterns, which are formed at a predetermined height h so as to have a shape that penetrates up to a portion of the thickness y of a substrate layer through the thickness x of a surface layer.

DESCRIPTION OF THE REFERENCE NUMERALS OF THE DRAWINGS

10: substrate layer,
20: surface layer,
40: engraved pattern
100: upper pattern

BEST MODE

Hereinafter, a detailed description will be given of the present invention with reference to the accompanying drawings.

Figure 1:
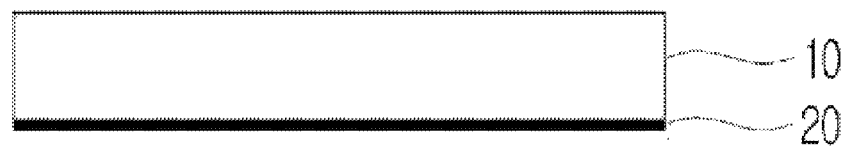

The light guide plate according to the present invention is illustrated in FIG. 1, and is configured to include a substrate layer 10 including, as a main component, a resin having a light transmittance of at least 90%, a refractive index of 1.47 to 1.59, and a water absorption rate of less than 0.30%, and a surface layer 20 formed on the lower surface of the substrate layer 10 and composed mainly of a resin having a refractive index difference of 0.05 or less and a hardness increased by at least 1 H compared to the main component resin of the substrate layer, and a light transmittance of at least 90%.

[Substrate Layer]

In the light guide plate according to the present invention, the substrate layer preferably includes, as a main component, a resin having superior optical properties, and particularly a resin having a light transmittance of at least 90% and a refractive index ranging from 1.47 to 1.59.

In the foregoing and following description, the expression "including a resin as a main component" or "composed mainly of a resin" used in connection with the resin composition means that a resin is contained in an amount of at least 95 wt % based on the total weight of the resin composition of the corresponding layer within a range that does not retard the optical properties required of the light guide plate.

The resin satisfying such properties may include resin having superior optical properties, and may be selected from the group consisting of a resin selected from among a polycarbonate-based resin, a polystyrene-based resin, an acrylic resin, an olefin-based resin, a polyester-based resin and a polyamide-based resin, a copolymer thereof, a mixture thereof, and a derivative thereof.

The substrate layer preferably has a water absorption rate of less than 0.30% in order to ensure superior dimensional stability regardless of an external environment. Hence, a copolymer including 60 wt % or less of methyl methacrylate is preferably useful. In particular, the use of a copolymer of methyl methacrylate and styrene (which is abbreviated to an "MS resin") is preferable.

An MS resin is a thermoplastic resin that is lightweight and inexpensive, with a low water absorption rate. When it is used as the main component, the resulting light guide plate may exhibit good dimensional stability.

Examples of the MS resin may include MS500, MS600 and MS750 depending on the amount of methyl methacrylate. In the present invention, preferably useful as the MS resin is MS600 or MS500. Most preferably, the substrate layer is composed exclusively of such an MS resin.

Meanwhile, the substrate layer may have a thickness ranging from 0.5 to 4.5 mm in consideration of realizing a consistent thickness upon extrusion and a slim display.

The substrate layer may be configured such that a light-emitting surface, that is, the upper surface of the substrate layer, is not structurally patterned, or may have a variety of three-dimensional patterns within a range that does not retard the effects of the present invention. In order to improve luminance, a lenticular pattern may be used, but the present invention is not limited thereto.

When the upper surface of the substrate layer has a pattern, the thickness of the substrate layer indicates the total thickness including the upper pattern.

[Surface Layer]

In the light guide plate, the surface layer is a layer in which a variety of patterns are formed taking into consideration the light path, and the pattern is typically formed through a printing process or a V-cut process.

In the process of forming the pattern, laser processing enables fine patterning on a large area and the formation of a fine pattern in any shape, and is a high-quality ultra-fine processing technology by virtue of low impact on a sample due to a short processing time and high power output, but is not easy to perform depending on the type of material, or may cause scratching.

Hence, the surface layer of the light guide plate according to the present invention is composed mainly of a resin having a refractive index difference of 0.05 or less and a hardness increased by at least 1 H compared to the main component resin of the substrate layer, with a light transmittance of at least 90%.

The resin satisfying such properties may be selected from the group consisting of a resin selected from among a polycarbonate-based resin, a polystyrene-based resin, an acrylic resin, an olefin-based resin, a polyester-based resin and a polyamide-based resin, a copolymer thereof, a mixture thereof, and a derivative thereof, and may be selectively used within a range that satisfies the above properties in consideration of the main component resin of the substrate layer.

In particular, the surface layer may be a polymethyl methacrylate (PMMA) resin or a copolymer including at least 70 wt % of methyl methacrylate in order to ensure superior processability and scratch resistance.

For example, when the substrate layer is composed mainly of an MS resin, the surface layer composed mainly of a PMMA resin having higher hardness than that of the MS resin may exhibit superior scratch resistance and processability.

Most preferably, the surface layer is composed exclusively of a PMMA resin.

In the present invention, the surface layer may be disposed taking into account processability and scratch resistance, but a light guide plate comprising only the substrate layer may be regarded as optimal considering the light path. When layers other than the substrate layer are provided, luminance may be inevitably lost.

Hence, the light guide plate of the present invention preferably includes a surface layer that is provided in the form of as thin a film as possible.

The thin film has a thickness corresponding to about 1 to 5% of the total thickness of the light guide plate, and preferably the surface layer is formed at a thickness ranging from about 30 μm to 150 μm, and more preferably ranging from 30 to 90 μm.

Given the above thickness range of the surface layer, the surface layer is formed to the extent that the interface with the substrate layer is not substantially formed, thereby minimizing the deterioration of the light path due to the interlayer interface.

In a preferred embodiment of the present invention, the light guide plate may be manufactured using a co-extrusion process. Specifically, respective resin compositions of the substrate layer and the surface layer are hot-melted into fluids using an extruder, and are simultaneously melt-discharged via a feed block, extruded in the form of a film via a T die and continuously pressed. Here, the thickness uniformity of the surface layer has to satisfy 20% or less.

If the thickness uniformity of the surface layer exceeds 20%, luminance uniformity may decrease and light emission may deteriorate due to the interlayer interface.

In the co-extrusion process, factors for adjusting the thickness of the surface layer are various, among which the discharge speed is a factor that is fixed depending on the predetermined thickness. For example, when the thickness of the surface layer is 40 μm, the resin for the surface layer may be extruded at a discharge speed of 15 kg/hr using an extruder having a screw diameter of 65 mm, and the resin of the substrate layer may be extruded at a discharge speed of 700 kg/hr using an extruder having a screw diameter of 120 mm.

For the thickness uniformity of the surface layer, adjusting the flow rate of each of the substrate layer and the surface layer is regarded as important. This is because the resin is melted and the pressure of each layer may vary depending on the melting temperature and the screw speed, and thus the flow rate becomes different. Hence, the flow rates of individual layers have to become similar to each other, and individual layers should have similar pressure values. The parameters therefor include a screw speed, a gear pump speed (rpm) and a melting temperature.

When the processing factors are regulated in this way, the thickness uniformity of the surface layer is preferably controlled to 20% or less.

Thereby, the surface layer is provided in the form of a thin film, thus obtaining a light guide plate having superior scratch resistance and processability without a reduction in luminance.

Even when the light guide plate thus obtained further includes the surface layer in addition to the substrate layer, the surface layer may not function as an optical foreign layer.

[Engraved Pattern]

Figure 2:
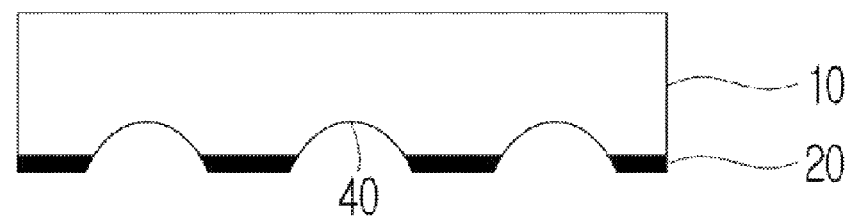

The light guide plate of the present invention is able to further increase luminance by forming a pattern on the surface of the surface layer. In particular, the pattern may include a plurality of engraved patterns. The plurality of engraved patterns may be present within the thickness of the surface layer. Alternatively, as illustrated in FIGS. 2 and 3, the pattern may be formed in a shape that penetrates up to a predetermined portion of the thickness of the substrate layer through the surface layer.

As shown in the drawings, engraved patterns meeting the same dimension may be continuously formed at the same interval, and the dimension and/or interval of the patterns may vary taking into consideration the light-incident surface/light-facing surface. Here, the light-incident surface is the side of the light guide plate on which light from an LED package is incident, and the light-facing surface is the other side thereof, facing the light-incident surface.

For example, the pattern interval may be formed to be narrow as being farther away from the light source on the surface close to the light-incident surface.

Figure 3:
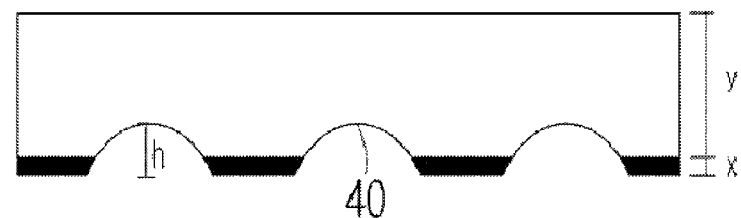

The case where the engraved patterns are formed in a shape that penetrates up to the predetermined portion of the thickness of the substrate layer through the surface layer is specified with reference to FIG. 3. The height h of the engraved pattern may be set by combining the thickness x of the surface layer with the thickness corresponding to 0.1 to 10% of the thickness y of the substrate layer, and may be represented by Equation 1 below.

$$x+(1/1000)y \leq h \leq x+(1/10)y \qquad \text{<Equation 1>}$$

In Equation 1, x is the thickness of the surface layer, y is the thickness of the substrate layer, and h is the height of the engraved pattern.

In Equation 1, if the height h of the engraved pattern is less than "$x+(1/1000)y$", an effect of increasing luminance due to the formation of the engraved patterns is significant. On the other hand, if the height thereof exceeds "$x+(1/10)y$", the laser processing time is lengthened, and light visibility may become problematic.

The three-dimensional structure of the engraved pattern is not limited, so long as the engraved pattern satisfies the above penetration shape. For example, the longitudinal cross-sectional shape thereof may be selected from the group consisting of a semicircular shape, a triangular shape, a rectangular shape, and an irregular shape.

Also, the engraved patterns may be formed continuously or discontinuously adjacent to each other.

In the present invention, the engraved pattern is formed in a shape that penetrates up to the predetermined range of the total thickness of the substrate layer, whereby light that is incident on one side of the light guide plate is prevented from escaping from the other side thereof, thereby preventing the luminance degradation.

As described above, the light guide plate according to the present invention may exhibit high scratch resistance and processability and may minimize a reduction in luminance due to the presence of the substrate layer having superior dimensional stability, the surface layer having high hardness, and the engraved patterns that are formed in a shape that penetrates up to the predetermined portion of the thickness of the substrate layer.

A backlight unit including such a light guide plate is effective at preventing a reduction in luminance and improving scratch resistance and processability.

MODE FOR INVENTION

A better understanding of the present invention may be obtained through the following examples, which are set forth to illustrate, but are not construed as limiting the scope of the present invention.

Example 1

700 kg/hr of MS (available from Denka, MS500, a copolymer of 50 wt % methyl methacrylate and 50 wt % styrene, having a light transmittance of 91%, a refractive index of 1.54, a pencil hardness (ASTM D3363) of 1 H, and a water absorption rate of 0.25%) was placed in an extruder having a uniaxial screw diameter of 120 mm and extracted at 230 to 240° C., and 15 kg/hr of PMMA (available from LGMMA, HP202, having a light transmittance of 94%, a refractive index of 1.49, and a pencil hardness (ASTM D3363) of 2H) was placed in an extruder having a uniaxial screw diameter of 65 mm and extruded at 240 to 250° C., after which they were simultaneously melt-discharged via a feed block, extruded using a T-die and pressed, thereby manufacturing a light guide plate.

Here, a surface layer having a thickness uniformity of 20% was formed by controlling the screw speed, the gear pump rpm and the melting temperature.

The surface layer was processed with a laser pattern to thus form engraved patterns having a semicircular shape as a longitudinal cross-sectional shape and a height of 50 μm and a width of 60 μm, resulting in a light guide plate.

The properties of the resin and the thickness uniformity of the surface layer were measured as follows.

(1) Light transmittance: Based on ASTM D1003, total light transmittance and haze were measured using an NDH-2000, available from Nitto.

As used herein, the term "light transmittance" refers to total light transmittance unless otherwise stated.

(2) Refractive index: Based on ASTM D1218, a refractive index was measured using an Abbe refractometer.

(3) Pencil hardness

Based on ASTM D3363, an evaluation pencil (available from Mitsubishi, Uni) was used to draw on the corresponding surface, along with a pencil hardness meter (available from Heidon, 14FW) under a load of 500 kg/cm and at a speed of 0.5 mm/sec, followed by measuring pencil hardness. The results are shown in Table 2 below.

(4) Water absorption rate

The water absorption rate was measured through an ASTM D570 testing method. A sample was dried in an oven at 60° C. for 24 hr, weighed, and immersed in water at 23° C. for 24 hr. The water absorption rate was calculated from the dry weight before immersion and the weight after immersion in water using Equation 1 below.

Water absorption rate (%)=(weight after immersion−dry weight before immersion)/dry weight before immersion*100   <Equation 1>

(5) Thickness uniformity of surface layer

The cross-section of the light guide plate was observed using a microscope (available from KEYENCE, VK-X100), and 30 points thereof were measured and represented by an allowable error percentage.

The allowable error refers to the extent to which the measured value is allowed among errors for the thickness of the surface layer, and is expressed as a percentage.

The thickness uniformity is defined as a value calculated using Equation 2 below.

Thickness uniformity (%)={(measured maximum value−reference value)+(reference value−measured minimum value)}/reference value×100   <Equation 2>

Examples 2 to 4

Individual light guide plates were manufactured in the same manner as in Example 1, with the exception that the thickness of the surface layer was changed as shown in Table 1 below.

The surface layer was formed so as to satisfy the thickness uniformity shown in Table 1 by controlling the screw speed, the gear pump rpm and the melting temperature.

Examples 5 to 8

Individual light guide plates were manufactured in the same manner as in Example 1, with the exception that the surface layer was processed with a laser pattern so as to have engraved patterns having the height shown in Table 1 and a semicircular shape as a longitudinal cross-sectional shape.

The surface layer was formed so as to satisfy the thickness uniformity shown in Table 1 by controlling the screw speed, the gear pump rpm and the melting temperature.

Examples 9 and 10

Individual light guide plates were manufactured in the same manner as in Example 1, with the exception that the thickness uniformity of the surface layer was set as shown in Table 1 and engraved patterns having a semicircular shape, as a longitudinal cross-sectional shape, were formed.

Examples 11 and 12

Individual light guide plates were manufactured in the same manner as in Example 1, with the exception that the substrate layer was formed with a lenticular pattern (Example 11—a width of 200 μm and a height of 50 μm, Example 12—a width of 300 μm and a height of 50 μm) using a pattern roll having the corresponding pattern.

Figure 4:
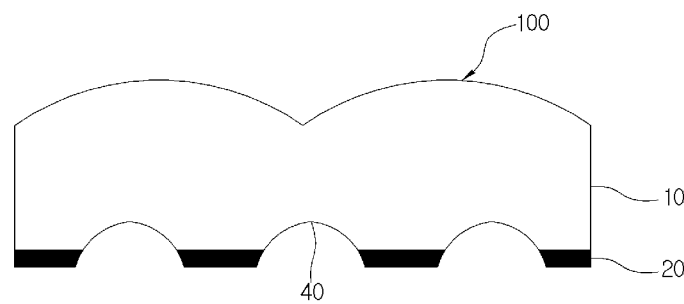
FIG. 4 illustrates a light guide plate including a substrate layer having an upper pattern 100 and a surface layer formed on the lower surface of the substrate layer and having a plurality of engraved patterns.

The typical structure of the light guide plates of these Examples is illustrated in FIG. 4.

Reference Examples 1 to 3

Individual light guide plates were manufactured in the same manner as in Example 1, with the exception that the thickness of the surface layer was changed as shown in Table 1 below.

The surface layer was formed so as to satisfy the thickness uniformity shown in Table 1 by controlling the screw speed, the gear pump rpm and the melting temperature.

Reference Examples 4 and 5

Individual light guide plates were manufactured in the same manner as in Example 1, with the exception that the height of the engraved patterns of the surface layer was changed as shown in Table 1.

The surface layer was formed so as to satisfy the thickness uniformity shown in Table 1 by controlling the screw speed, the gear pump rpm and the melting temperature.

Reference Examples 6 and 7

Individual light guide plates were manufactured in the same manner as in Example 1, with the exception that the thickness uniformity of the surface layer was set as shown in Table 1 and engraved patterns having a semicircular shape when viewed in a longitudinal cross-section were formed.

The light guide plates of Examples and Reference Examples were measured for luminance and pattern visibility through the following methods, and the pencil hardness thereof was measured as above. The results are shown in Table 2 below. The pencil hardness was a value obtained by measuring the lower surface of the substrate layer.

<Measurement of Luminance>

The light guide plate (Example or Comparative Example), a diffusion film (Kolon), a prism film (Kolon) and DBEF (3M) were sequentially stacked on a BLU (Backlight Unit, 27 inch LED 1 vertical), and 13 points thereof were measured using a luminance meter (BM-7A, available from TOPCON) and averaged.

The luminance of Comparative Example 1 was taken as a reference value (Ref., 100%), and the luminance value relative to Ref. was measured.

In Comparative Example 1, a light guide plate was configured such that the surface layer was not formed, and the lower surface of a substrate layer made of MS (available from Denka, MS500, a copolymer of 50 wt % methyl methacrylate and 50 wt % styrene, having a light transmittance of 91%, a refractive index of 1.54, a pencil hardness (ASTM D3363) of 1 H, and a water absorption rate of 0.25%) was formed with engraved patterns having a semicircular shape when viewed in longitudinal cross-section.

In Comparative Example 2, a light guide plate was manufactured in the same manner as in Comparative Example 1, with the exception that the lenticular pattern having the same dimension as in Example 11 was formed on the substrate layer.

<Measurement of Pattern Visibility>

The light guide plate was observed with the naked eye, and whether the pattern formed at the lower position was visible was determined.

TABLE 1

| | Substrate layer | | Surface layer | | Engraved pattern | |
|---|---|---|---|---|---|---|
| | Thickness (μm) | Formation of upper pattern | Thickness (μm) | Thickness uniformity (%) | Height (μm) | Longitudinal cross-sectional shape |
| Ex. 1 | 2960 | No | 40 | 20 | 50 | Semicircular |
| Ex. 2 | 2950 | No | 50 | 20 | 50 | Semicircular |
| Ex. 3 | 2900 | No | 100 | 20 | 50 | Semicircular |
| Ex. 4 | 2870 | No | 130 | 20 | 50 | Semicircular |
| Ex. 5 | 2960 | No | 40 | 20 | 30 | Semicircular |
| Ex. 6 | 2960 | No | 40 | 20 | 40 | Semicircular |
| Ex. 7 | 2960 | No | 40 | 20 | 60 | Semicircular |
| Ex. 8 | 2960 | No | 40 | 20 | 100 | Semicircular |
| Ex. 9 | 2960 | No | 40 | 5 | 50 | Semicircular |
| Ex. 10 | 2960 | No | 40 | 10 | 50 | Semicircular |
| Ex. 11 | 2960 | Lenticular pattern (200 μm pitch) | 40 | 20 | 50 | Semicircular |
| Ex. 12 | 2960 | Lenticular pattern (300 μm pitch) | 40 | 20 | 50 | Semicircular |
| Comp. Ex. 1 | 3000 | No | Not formed | — | 50 | Semicircular |
| Comp. Ex. 2 | 3000 | Lenticular pattern (200 μm pitch) | Not formed | — | 50 | Semicircular |
| Ref. Ex. 1 | 2980 | No | 20 | 20 | 50 | Semicircular |
| Ref. Ex. 2 | 2830 | No | 170 | 20 | 50 | Semicircular |
| Ref. Ex. 3 | 2750 | No | 250 | 20 | 50 | Semicircular |
| Ref. Ex. 4 | 2960 | No | 40 | 20 | 0.3 | Semicircular |
| Ref. Ex. 5 | 2960 | No | 40 | 20 | 310 | Semicircular |
| Ref. Ex. 6 | 2960 | No | 40 | 30 | 50 | Semicircular |
| Ref. Ex. 7 | 2960 | No | 40 | 50 | 50 | Semicircular |

TABLE 2

|  | Luminance (%) | Pattern visibility | Pencil hardness (ASTM D3363) |
|---|---|---|---|
| Ex. 1 | 120 | Not viewed | 2H |
| Ex. 2 | 117 | Not viewed | 2H |
| Ex. 3 | 113 | Not viewed | 2H |
| Ex. 4 | 110 | Not viewed | 2H |
| Ex. 5 | 110 | Not viewed | 2H |
| Ex. 6 | 115 | Not viewed | 2H |
| Ex. 7 | 126 | Not viewed | 2H |
| Ex. 8 | 132 | Not viewed | 2H |
| Ex. 9 | 129 | Not viewed | 2H |
| Ex. 10 | 125 | Not viewed | 2H |
| Ex. 11 | 128 | Not viewed | 2H |
| Ex. 12 | 130 | Not viewed | 2H |
| Comp. Ex. 1 | 100 | Not viewed | H |
| Comp. Ex. 2 | 104 | Not viewed | H |
| Ref. Ex. 1 | 98 | Not viewed | 2H |
| Ref. Ex. 2 | 92 | Not viewed | 2H |
| Ref. Ex. 3 | 84 | Not viewed | 2H |
| Ref. Ex. 4 | 81 | Not viewed | 2H |
| Ref. Ex. 5 | 148 | Viewed | 2H |
| Ref. Ex. 6 | 98 | Not viewed | 2H |
| Ref. Ex. 7 | 86 | Not viewed | 2H |

The invention claimed is:

1. A light guide plate, comprising:
a substrate layer including, as a main component, a resin having a light transmittance of at least 90%, a refractive index of 1.47 to 1.59, and a water absorption rate of less than 0.30%; and
a surface layer formed on a lower surface of the substrate layer and composed mainly of a resin having a refractive index difference of 0.05 or less and a hardness increased by at least 1 H compared to the main component resin of the substrate layer with a light transmittance of at least 90%,
wherein the light guide plate has a plurality of engraved patterns which are formed in a shape that penetrates up to a predetermined thickness of the substrate layer through the surface layer.

2. The light guide plate of claim 1, wherein the surface layer has a thickness corresponding to 1 to 5% of a total thickness of the light guide plate.

3. The light guide plate of claim 2, which is manufactured using a co-extrusion process.

4. The light guide plate of claim 2, each of the engraved patterns forms a semicircular groove.

5. The light guide plate of claim 1, wherein the surface layer has a thickness ranging from 30 μm to 150 μm.

6. The light guide plate of claim 5, which is manufactured using a co-extrusion process.

7. The light guide plate of claim 5, which is manufactured each of the engraved patterns forms a semicircular groove.

8. The light guide plate of claim 1, wherein the plurality of engraved patterns is formed in a shape that penetrates up to a thickness corresponding to 0.1 to 10% of a total thickness of the substrate layer.

9. The light guide plate of claim 1, wherein the plurality of engraved patterns has a longitudinal cross-section having a shape selected from the group consisting of a semicircular shape, a triangular shape, a rectangular shape, and an irregular shape.

10. The light guide plate of claim 1, which is manufactured using a co-extrusion process.

11. The light guide plate of claim 10, wherein the co-extrusion process is performed in a manner in which respective resins of the substrate layer and the surface layer are hot-melted into fluids using an extruder, and are simultaneously melt-discharged using a feed block, extruded via a T-die, and continuously pressed, so that a thickness uniformity of the surface layer satisfies 20% or less.

12. The light guide plate of claim 1, wherein the substrate layer is composed mainly of a resin selected from the group consisting of a polycarbonate-based resin, a polystyrene-based resin, an acrylic resin, an olefin-based resin, a polyester-based resin and a polyamide-based resin, a copolymer thereof, a mixture thereof, and a derivative thereof.

13. The light guide plate of claim 1, wherein the surface layer is composed mainly of a resin selected from the group consisting of a polycarbonate-based resin, a polystyrene-based resin, an acrylic resin, an olefin-based resin, a polyester-based resin and a polyamide-based resin, a copolymer thereof, a mixture thereof, and a derivative thereof.

14. The light guide plate of claim 1, wherein the substrate layer is composed mainly of a copolymer including 60 wt % or less of methyl methacrylate.

15. The light guide plate of claim 1, wherein the surface layer is composed mainly of a polymethyl methacrylate resin or a copolymer including at least 70 wt % of or methyl methacrylate.

16. The light guide plate of claim 1, wherein the substrate layer comprises a methyl methacrylate-styrene resin, and the surface layer comprises a polymethyl methacrylate resin.

17. A backlight unit, comprising the light guide plate of claim 1.

* * * * *